United States Patent [19]

Vacca

[11] Patent Number: 5,549,286

[45] Date of Patent: Aug. 27, 1996

[54] WINDSHIELD WIPER DEVICE HAVING AN ANGLE DAMPER, IN PARTICULAR FOR A MOTOR VEHICLE

[75] Inventor: Frédéric Vacca, Behoust, France

[73] Assignee: Valeo Systemes D'Essuyage, Montigny-Le-Bretonneux, France

[21] Appl. No.: 173,653

[22] Filed: Dec. 17, 1993

[30] Foreign Application Priority Data

Dec. 17, 1992 [FR] France .................................. 92 15245

[51] Int. Cl.⁶ ............................................ F16F 1/14
[52] U.S. Cl. ..................... 267/154; 267/136; 15/250.30
[58] Field of Search .................................. 267/134, 136, 267/137, 140, 153, 154, 157, 160, 162, 164, 165, 293, 294; 15/250.13, 250.29, 250.3, 250.32, 250.33; 318/443, 444

[56] References Cited

U.S. PATENT DOCUMENTS

| | | | |
|---|---|---|---|
| 3,282,120 | 11/1966 | Compton | 15/250.13 |
| 4,043,546 | 8/1977 | Ashfield et al. | 267/162 |
| 4,546,518 | 10/1985 | Harbison et al. | 150/250.23 |
| 4,688,662 | 8/1987 | Correll | 267/154 |
| 4,711,434 | 12/1987 | Haag | 267/165 |
| 4,768,761 | 9/1988 | Kramer | 267/154 |
| 4,826,145 | 5/1989 | Moore et al. | 267/154 |

FOREIGN PATENT DOCUMENTS

| | | |
|---|---|---|
| 0491603 | 6/1992 | European Pat. Off. . |
| 0498949 | 8/1992 | European Pat. Off. . |
| 3740312 | 6/1989 | Germany . |
| 62-131845 | 6/1987 | Japan . |
| 9100203 | 1/1991 | WIPO . |

Primary Examiner—Robert J. Oberleitner
Assistant Examiner—Chris Schwartz
Attorney, Agent, or Firm—Morgan & Finnegan, L.L.P.

[57] ABSTRACT

A windshield wiper device generally comprises a shaft supported by a fixed element, such as the base of a housing of a geared motor, this shaft being rotatable around an axis by a reduction gear system and connecting rod assembly; an angle damping device is disposed between the fixed element and the shaft. According to the invention, the angle damping device comprises at least one elastic washer axially compressed along the axis of the shaft. The axial compression of the elastic washer is controlled by a cam having a variety of angular sectors for moving axially along the shaft.

19 Claims, 4 Drawing Sheets

5,549,286

WINDSHIELD WIPER DEVICE HAVING AN ANGLE DAMPER, IN PARTICULAR FOR A MOTOR VEHICLE

FIELD OF THE INVENTION

The present invention relates to a windshield wiper device having an angle damper, in particular for a motor vehicle.

BACKGROUND OF THE INVENTION

In customary windshield wiper devices, whether they comprise a motor controlling a transmission mechanism comprising a variety of connecting rods and cranks operating a drive shaft for a windshield wiper arm equipped with a windshield wiper blade capable of wiping against a glazed surface, such as a windshield of a motor vehicle, or whether they involve a geared motor fitted with a motor driving a reduction gear equipped with a reduction system driving a connecting rod system operating an output shaft directly driving the windshield wiper arm and blade, or indirectly driving this arm-blade unit by means of such a transmission mechanism, there is still the problem of controlling the wiping angle with the greatest precision possible.

As is known, the wiping angle of the windscreen wiper arm-blade unit, i.e. the angle which this unit travels from one extreme position to another, is determined either by a particular arrangement of the connecting rods and cranks of the transmission mechanism or of the connecting rod system of the geared motor, or by the electric motor itself.

Bearing in mind firstly the clearance necessary for the operation of the connecting rod system or of the transmission mechanism and secondly the inertia of the arm-blade unit during its wiping travel, this theoretical wiping angle is normally exceeded; this may result in a malfunction, for example the windshield wiper blade may knock against one of the edges of the surface to be wiped and cause the destruction of the blade itself, and/or generate noise which discomforts the user.

It has been proposed partially to resolve this problem in the case of a geared motor device in DE-A-3,740,312, in which an angle damper is provided between a fixed part of the geared motor and a mobile part of the connecting rod system thereof, such as the output shaft.

Although this arrangement is generally satisfactory, it has been observed that this damper involves a larger radial space requirement at the level of the connection of the shaft, and requires specific arrangements for each type of geared wheel.

In practice, an elastomer material is disposed between a gear wheel carried by the crank of the connecting rod system and the base of a substantially semi-circular groove in the fixed part of the housing, the groove being concentric with the shaft.

These arrangements are very elaborate, very difficult to perform and require, during mounting, a very precise and meticulous assembly operation, which is detrimental to the cost price of the product.

DISCUSSION OF THE INVENTION

In this invention, it is proposed to remove the drawbacks mentioned above by providing a windshield wiper device having an angle damper which can equally be applied either to a geared motor, and in particular to its connecting rod assembly, or to a transmission mechanism, in particular to the drive shaft of this mechanism.

According to the invention, a windshield wiper device, in particular for a motor vehicle, comprises a shaft carried by a fixed element and being rotatable around an axis by means of a control means, and a damping device disposed between the fixed element and the shaft, the damping device comprising an elastic means which is subject to axial compression in the direction along the axis of said shaft.

In consequence of this arrangement, and because the elastic means is axially compressed, the radial spatial requirement of the windshield wiper device is not increased.

Other characteristics and advantages of the invention will be apparent from the following description with reference to the attached drawings.

DESCRIPTION OF THE PREFERRED EMBODIMENTS OF THE INVENTION

Figure 1:
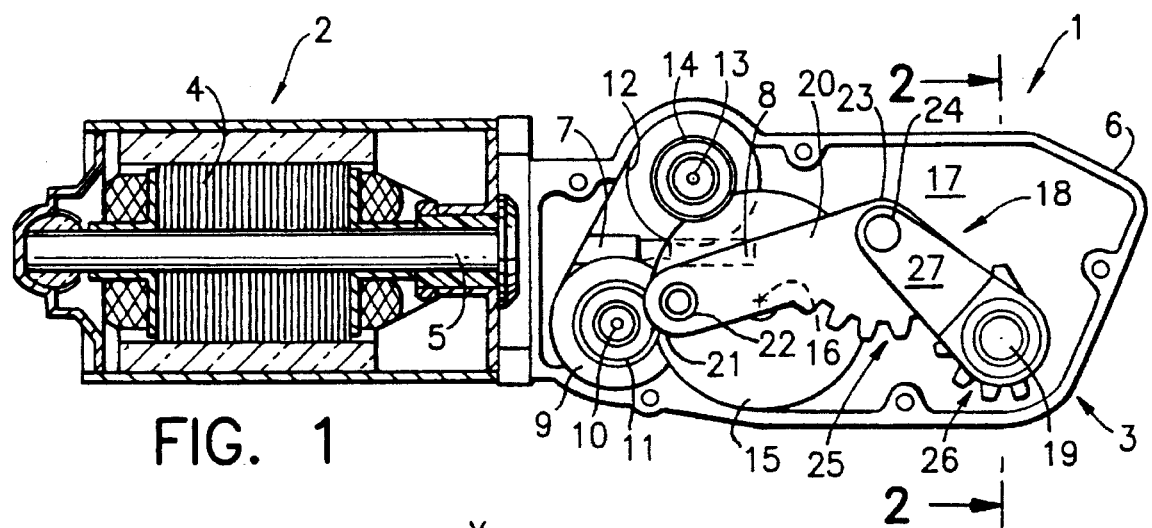
FIG. 1 is a front view with a partial section of a geared motor to which the invention is applied.
Figure 2:
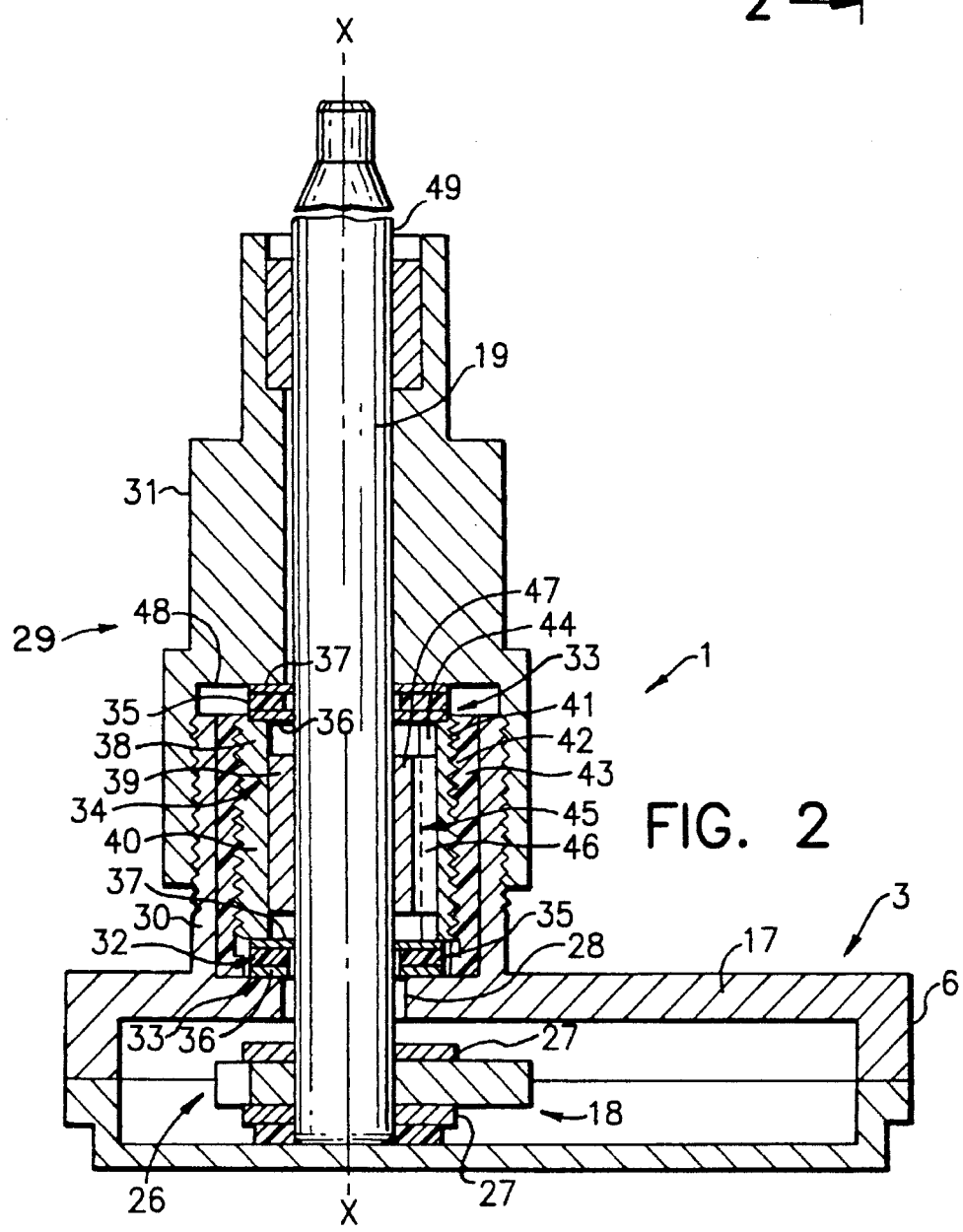
FIG. 2 is a sectional view along line 2—2 of FIG. 1.

FIGS. 1 and 2, show an embodiment to which the present invention applies, in this case consisting of a geared motor, but which may, without departing from the scope of the invention, be applied to any other suitable transmission mechanism.

In these Figures, the geared motor 1 comprises an electric motor 2 associated with a reduction gear 3.

The electric motor 2 comprises a rotor 4, the rotor shaft 5 of which extends inside a housing 6 of the reduction gear 3.

The shaft 5 bears two worm gears 7, 8 cut at the end of shaft 5 adjacent to one another.

Cooperating with the worm 7 is a primary pinion 9 having an axis 10 perpendicular to the general axis of the rotor shaft 5. This pinion carries a secondary pinion 11 having a smaller diameter in a concentric and integral manner.

Cooperating with the worm 8 is a primary pinion 12 having an axis 13 substantially parallel to the axis 10, this pinion 12 carrying a secondary pinion 14 having a smaller diameter in a concentric and integral manner.

The diameters of the primary pinions are identical and so are the diameters of the secondary pinions, and the axes 10, 13 are disposed on both sides of the axis of the shaft 5 whilst being the same distance therefrom.

The secondary pinions 11, 14 mesh with a toothed wheel 15 having an axis of rotation 16 substantially parallel to the axes 11, 13.

In a practical manner the axes 10, 13, 16 are formed in a fixed part, here the base 17 of the housing, whilst allowing the rotation of these pinions and this toothed wheel and the shaft 5 with its worm gears 7, 9 associated with the pinions 9, 11, 12, 14 connected to the wheel 15 forming a reduction system.

The toothed wheel 15 is capable of actuating a direction reversal mechanism, in this case a connecting rod assembly 18, enabling the inversion of the direction of rotation of an output shaft 19 having an axis XX substantially parallel to the axes of the pinions and of the wheel and which is supported by a fixed part 17 of the housing 6 and particularly the base thereof, so as to obtain a reciprocal rotational movement of this shaft.

The direction reversal mechanism 18 is formed by an arm 20 rotatably connected by one of its ends 21 to the toothed wheel 15 by a pin 22 disposed in an eccentric manner in relation to the axis 16 of the wheel whilst being parallel thereto.

The other end 23 of the arm 20 carries a pin 24 and, concentrically to said pin, a toothed sector 25 capable of moving around the pin 24.

This toothed sector 25 is capable of meshing with a toothed sector 26 provided in a concentric and integral manner by the output shaft 19.

The output shaft 19 is connected to the axle 24 by two end plates 27 situated on both sides of the toothed sectors 25, 26. These end plates freely rotate around the output shaft 19 whereas the axle 24 is mounted in a rotationally fixed manner on said end plates so that it can permit an oscillation of the arm 21 around the axle 24.

The shaft 19 passes, in a substantially perpendicular manner, through the base 17 of the housing 6 through an aperture 28 in said housing, this shaft passing through a tubular column 29 which is concentric to the aperture 28 in the base 17.

The column 29 is formed by two parts, a first part, referred to as the pedestal 30, having a larger internal diameter than the diameter of the aperture 28, and a second part, referred to as cap 31, which extends over the pedestal and is screwed on to it.

As can be seen from FIG. 2, the pedestal 30 is capable of receiving an angle damper 32 placed between the fixed part formed by the base 17 and the pedestal 30 and the shaft 19, which rotates around its axis XX by means of a control means, here formed by the reduction gear system and the connecting rod assembly.

The pedestal 30 is in the form of a tubular part concentric with the axis XX of the shaft 19 originating from the base 17 and preferably being in one piece with said base, the part of the base 17 of the housing 6 being used as a base for pedestal 30.

Figure 3:
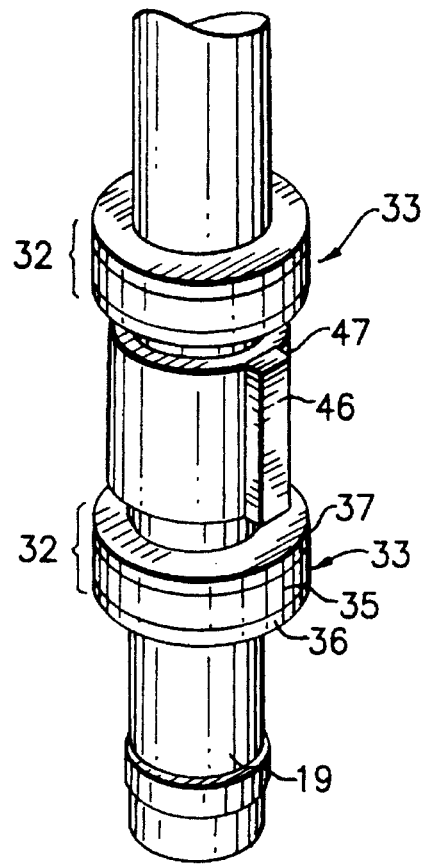
FIGS. 3 and 4 are perspective views each showing a detail of the invention.
Figure 4:
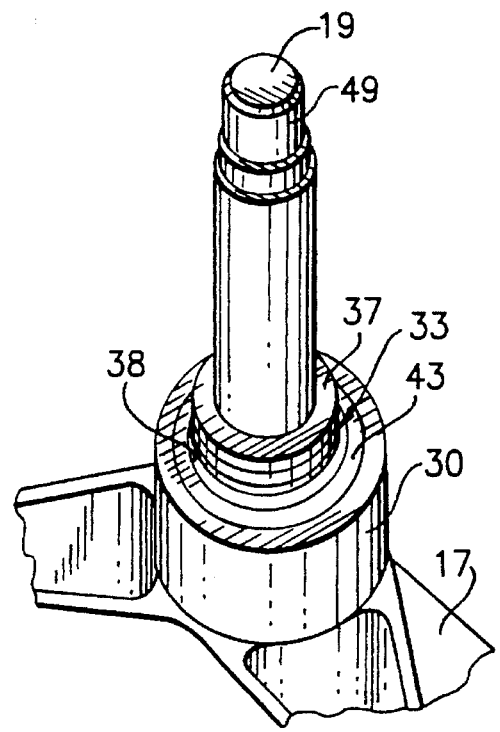

Furthermore, as will be apparent by referring to FIGS. 3 and 4, the angle damping device 32 is housed inside the hollow volume of this tubular part.

This angle damper is formed by elastic means 33 subject to axial drive means 34, both of which are disposed concentrically with the shaft 19.

The elastic means 33 are represented in the example by a washer made of elastomer 35, for example of the neoprene type; it is possible to use any other elastic means, in particular mechanical elastic means such as Belleville washers.

This elastic washer 35 is captured between two support washers 36, 37, the lower support washer 36 of which rests on the base 17 of the housing 3 and the upper support washer 37 of which is subject to the axial drive means 34.

The axial drive means 34 are formed by a pressure element 38 operated by a driving device 39.

The pressure element 38 is formed by a sleeve 40 disposed concentrically to the axis XX and having substantially the same diameter as the elastic washer 35 and comprises an external thread 41 cooperating with an internal thread 42 of a fixed guide 43 which is force-fitted inside the pedestal 30.

Furthermore, the internal periphery of the sleeve 40 has a recess 44, in this case in the form of an axial groove substantially parallel to axis XX of the shaft 19, this recess being used to contain a control member 45 from the driving device 39.

By way of example, the control member 45 is formed by a key 46 mounted in fixed manner on a ring 47 which is itself mounted concentrically in fixed manner on the shaft 19, the key and the ring forming the driving device.

Furthermore, second elastic means 33 are mounted on the other end of the axial drive means 34 by being disposed between it and a fixed support surface 48 of the cap 31.

To assemble the windshield wiper device according to the invention, in a first stage the elastic washer 35 captured between the support washers 36, 37 is located on the base of the pedestal 30 so that the washer 36 rests on the base 17, 17, i.e. on the base of the pedestal 30, then the output shaft 19 and its control means, here formed by the direction reversal unit 18 and the various toothed wheels, is introduced through the aperture 28 in the base 17 and the washers 35, 36, 37 so that the free end 49 of this shaft protrudes on the other side of the pedestal 30.

The driving device 39 formed by the ring 47 and the key 46 is fitted via the free end 49 of the shaft 19 so that it is situated roughly half-way between the base 17 and the free end of the pedestal 30, opposite the base 17.

After having assembled a case formed by the pressure element 38 and the fixed guide 43, by screwing one of the elements into the other element, this case is force-fitted into the pedestal 30 by making the recess 44 of the pressure element 38 cooperate with the control member 45 of the driving device 39.

Then a second elastic washer 35, captured between two support washers 36, 37, is mounted in contact with the end part opposite the base of the pressure element 38, and in a last stage the cap 31 is attached by screwing onto the pedestal 30 so that the support surface 48 thereof rests on the upper support washer 37 of the elastic means 33 disposed in the end part of element 38.

During operation, the rotation of the shaft 5 of the rotor 4 drives the primary pinions 9, 12, and the secondary pinions 11, 14 transmit this rotational movement to the toothed wheel 15. During the rotational movement of the wheel 15 around the shaft 16, the axis 22 carried by this wheel is rotated around said axis of the wheel.

This rotational movement is transformed into a reciprocal rotational movement at the output shaft by the action of the arm 20 and the cooperation of the toothed sectors 25, 26.

During this movement, certain operational and/or dimensional clearances between associated parts may be transmitted to the shaft 19, which may cause a modification in the wiping angle of the arm-wiper unit mounted either directly on the end 49 of the shaft 19, or indirectly by means of a transmission mechanism connected to the free end 49. Examples of such operational and/or dimensional clearances which may cause modification in the wiping angle include, but are not limited to, the operational and/or dimensional clearances existing between: (a) the worms 7, 8 and the primary wheels 9, 12; (b) the secondary wheels 11, 13 and the toothed wheel 15; (c) the axis 22 and the recess which either the arm 20 or the wheel 15 displays, in order to enable the rotation of said arm around this axis; (d) the pin 24 and the arm 21; and (e) the toothed sectors 25, 26.

The angle damper 32 operates in the following manner: the rotational movement imparted to the shaft 19 by the control mechanism formed by the direction reversal mechanism 18 and the different toothed wheels, rotates the driving device 39 in the same direction, which, in turn, will rotate the sleeve 40 by the control member 45.

This sleeve 40, under the impetus of the driving device 39, will move axially by the cooperation of the external and internal threads and will rest on one of the elastic means 33.

To simplify the description, it will now be assumed, by way of example, that it is the elastic means 33 resting on the base 17 which is subject to the action of the pressure element.

In this case, the lower end of the sleeve 40 will rest on the upper washer 37 and compress the elastic washer 35 to its compression limit point. For this reason the elastic washer will act to brake the shaft since said shaft is connected to the driving device, and by reducing the stiffness of the elastic washer, it is possible to create, in an extreme position of the arm-wiper, a fixed stop which thus enables the wiping angle to be brought under better control.

In the opposite path of the arm-wiper unit, the elastic washer 35 is situated between the cap 31 and the end of the pedestal 30 which will in turn be subject to the action of the pressure element, the driving device actuating the sleeve in the opposite rotational direction.

Of course, the entire previous description relates to an output shaft of a geared motor, but this device may easily apply just to a drive shaft of a windshield wiper rod system, this drive shaft being driven by a connecting rod-crank system, which in this case would replace the direction reversal device 18 and the different toothed wheels, and only the pedestal 30 with its base corresponding to the wall of the base of the housing and the cap would remain.

Figure 5:
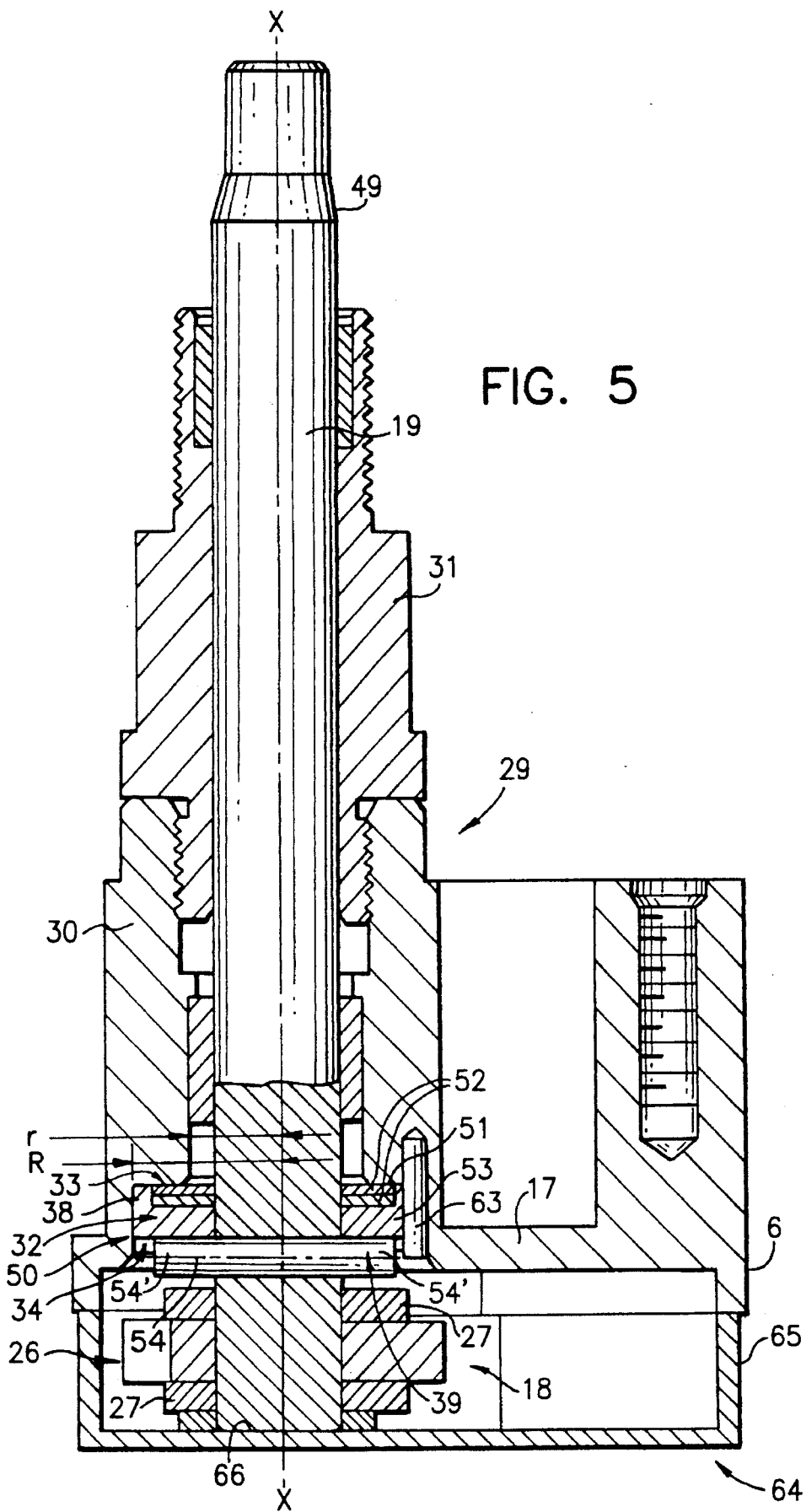
FIG. 5 is a sectional view roughly corresponding to line 2—2 in FIG. 1 and showing a first refinement of the invention.

Reference is now made to FIG. 5, which shows a refinement of the invention.

In this refinement, the shaft 19 passes through a countersinking 50 provided in the base of the housing 6 to project on the other side the pedestal 30 which is part of the column 29 on the other side, this pedestal 30 being capable of receiving a cap 31 through which the shaft 19 projects whilst thus enabling the end 49 of this shaft to be connected either to a windshield wiper arm or to a transmission mechanism.

As can be seen from this Figure, the countersinking 50 has an internal radius R which is larger than the internal radius r of the interior volume of the pedestal 30, whilst thus delimiting a support base 51.

Figure 6:
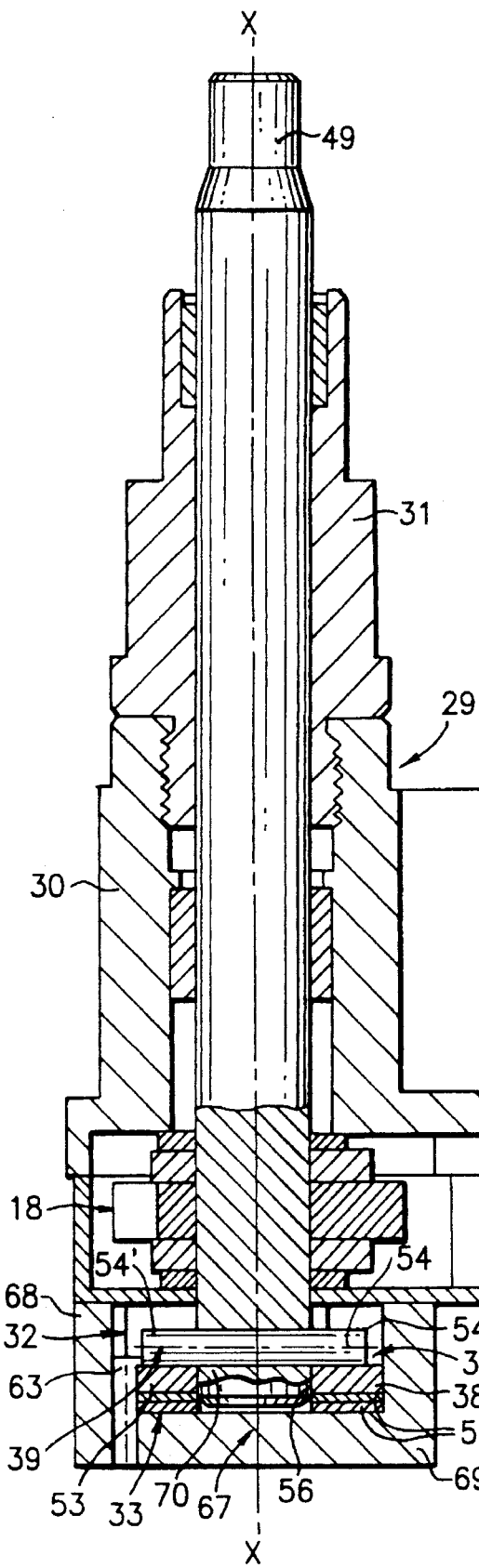
FIG. 6 is a sectional view passing through line 2—2 of FIG. 1 and showing a second refinement of the invention.

It is between this base 51 and the control means formed by the direction reversal mechanism 18 visible on FIG. 6 that an angle damper 32 is located.

This angle damper is formed by elastic means 33 which are axially compressed along axis XX of the shaft, which elastic means are subject to an axial drive means 34.

The elastic means 33 are in this case formed by two elastic washers 52 disposed one on top of the other whilst being concentric with the axis XX of the shaft 19 and by having a larger radius than the radius r, but smaller than the radius R. These elastic washers, which are for example of the Belleville washer type, rest firstly on the base 51 and secondly on a pressure element 38 formed by a cam 53.

This cam 53 is axially displaced along axis XX by a driving device 39, formed in the example in FIG. 5 by diametrally opposite radial projections, in this case comprising a pin 54 passing orthogonally through the shaft XX whilst protruding from the external periphery of said shaft and leaving two radial arms 54; which pin 54 rests on the cam 53.

Figure 7:
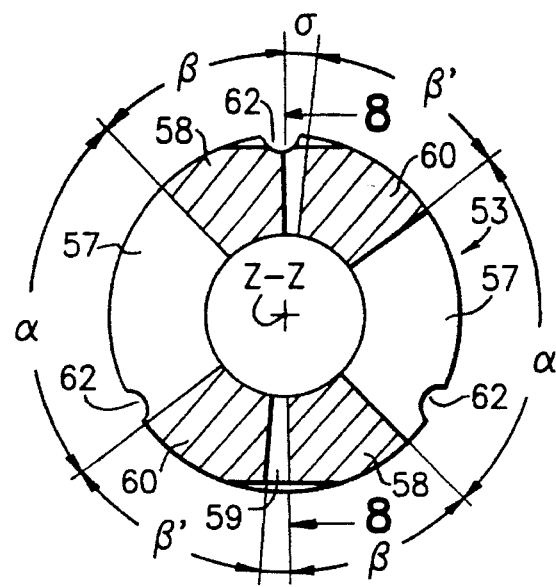
FIGS. 7,8 and 9 show a detail of the invention applied to FIGS. 5 and 6.
Figure 8:
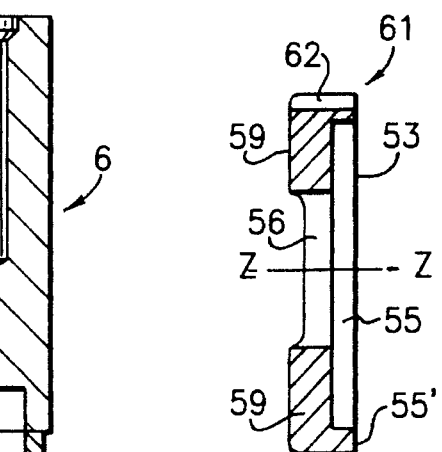
Figure 9:
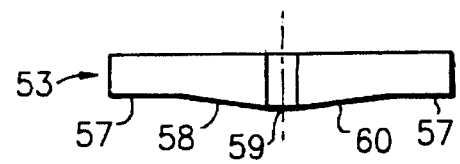

Now referring to FIGS. 7 to 9, in this case the cam is in the form of a recessed circular washer bearing a central bore 56 and, at one of its faces, a circular recess 55 for housing the elastic means 33, and for this purpose it has a radius which is substantially identical to the radius of the washers 52 previously mentioned, which leave a circumferential shoulder 55 having a height at most equal to the height of the stacked washers 52.

Furthermore, different sectors are situated, circumferentially one after the other, on the face opposite the recess 55.

With reference to FIGS. 7 and 9, two plane sectors 57, which are substantially horizontal and disposed diametrally opposite one another in relation to the axis ZZ of FIG. 7, are provided, these plane sectors having a limited angular range, as for example an angle $\alpha$ mentioned on FIG. 7.

By studying FIG. 7 in the clockwise direction, each plane sector 57 is followed by an inclined angular sector 58 having an angular range $\beta$, the inclination of which increases from the end of the plane sector 57 to a horizontal sector 59, substantially parallel to sector 57, also having an angular range limited by an angle $\sigma$ and disposed diametrally opposite, this horizontal sector 59 being followed by another inclined sector 60 of angular range $\beta'$ starting at the end of the horizontal angular sector 59 and ending at the level of the plane sector 57 whilst having a descending gradient from the horizontal sector 59 to the plane sectors 57, these sectors 60 also being situated on both sides of the axis ZZ.

Furthermore, the cam 53 is capable of bearing rotational immobilisation means 61, and which, in the case of the relevant FIG.s, consist of axial grooves 62 disposed equidistant from one another over the external periphery of the cam 53.

To produce the windshield wiper device shown in FIG. 5, in a first stage, the elastic washers 52 are disposed in the recess 55 of the cam 53, then the elastic washer-cam subassembly is introduced into the countersinking 50 provided in the base of the housing 17 so that one of the elastic washers 52 rests on the base 51 defined above, then a rotational stop 63 is introduced into the immobilisation means 61, these rotational stops here consisting of rods disposed substantially parallel to the axis XX. Once this operation has been performed, the output shaft 19, previously equipped with its transversal pin 54, is introduced through the central bore in the cam 53 and the central recesses of the elastic washers 52 to emerge on the other side of the column 29. In a last stage, an axial translation stop, during movement along axis XX, immobilises the shaft 19 along this column, this axial translation stop 64 here consisting of a cover 65 which covers the open face of the housing 6 whilst resting on the lower end part 66 of the shaft 19.

In operation, and referring to FIG. 5, the arms 54' of the pin 54 rest on the horizontal sectors 59, which corresponds to the position of rest of the windshield wiper device and to the desired terminal compression of the elastic means 33.

During a rotational movement in the clockwise direction of the shaft 19 under the impetus of the connecting rod assembly 18, each arm of the pin 54 will leave the horizontal sectors 59, and slide over the inclined sectors 60 before ending in the zone of the plane sector 57. During this movement, the cam 53 has undergone an axial displacement resulting from the contact of the pin 54 with the sectors in question. This axial displacement is towards the rear when studying FIG. 6 and the elastic washers 52 are no longer compressed. From the plane sector 57 each arm of the pin 54 will come into contact with the angular sectors 58 by compressing the washers 52, which will brake the shaft and the windshield wiper device which it bears, before arriving at an end phase in which the arms of the pin 54 rest on the horizontal sectors 59 by having compressed the elastic washers 52 as represented on FIG. 5 in the desired state.

Thus it may be noticed that by a simple arrangement of a cam and of a control means for said cam, the elastic means 33 may be operated in a very simple manner and further more a mechanical stop may be obtained with the rotation of the shaft 19.

Reference is now made to FIG. 6, which shows another refinement of the invention in which the angle damper 32 is situated outside the windshield wiper device.

To accomplish this, the angle damper is lodged in a housing 67 carried in a fixed manner by a fixed part of the housing 6 and in particular by the cover 65.

As can be seen from this FIG., this housing is provided in the form of a circular housing having a lateral wall 68 substantially parallel to the axis XX of the shaft 19 and a base 69 situated at a distance from the cover 65 whilst being substantially orthogonal to said axis XX.

The housing 67 is capable of receiving elastic means 33, which are formed here by two elastic washers 52 of the Belleville type placed one on top of the other, one of which rests on the base 69 of the housing 67 and the cam 53 which rests on the other elastic washer. This cam has an external diameter which is substantially equal to the internal diameter of the housing 67, whilst being immobilised during rotation around the axis XX by rotational stops 63.

The shaft is followed by a projection 70 protruding on the other side of the cover 65 and penetrating coaxially into the housing 67 so as to pass through the central bore 56 of the cam 53 and the central apertures of the elastic washers 52, this projection being equipped with a pin 54 transversally in relation to the axis XX, this pin resting, by its radial arms, on the cam 53 which comprises the same angular sectors as those described in relation to FIG. 5.

In this wiping mechanism, in order to obtain an angle damper, it is necessary only to attach the housing equipped with the elastic means and the axial drive means, and the operation of this refinement is identical to that described in relation to FIG. 5.

In consequence of this refinement, the windshield wiper device can be fitted with an angle damper, after the complete mounting of the mechanism formed by the electric motor and the reduction gear, this angle damper forming a module.

Of course, without departing from the scope of the invention as defined in the claims, the housing 67 may be in one piece with the cover 65 or be fixed thereto by any appropriate means, such as by screwing, tacking and fastening or be supported by another fixed part adjacent to the geared motor.

Moreover the driving device 39 created by the pin 54 may be provided by any other means such as forming the shaft 19 with two radial projections in a drawing operation.

Similarly the rotational immobilisation means 61 of the cam may be provided by any other device and in particular it may be specified that the washer 53 has a non-circular shape corresponding to a complementary, non-circular shape of the countersinking or of the housing capable of containing this washer.

The present invention is not restricted to the embodiments described but includes all refinements within the scope of the appended claims.

In particular, the angle dampers 32 may be used purely in relation to a windshield wiper linkage. In this case, the shaft 49 is driven in reciprocating rotation by a connecting rod-crank system, one of the connecting rods of which is directly connected to the end of the shaft 19, in this case the column 29 would correspond to a wiping bearing usually receiving said shaft and the fixed part would be a projection from this bearing, or the bearing itself.

What is claimed is:

1. A windshield wiper device, in particular for a motor vehicle, comprising a shaft supported by a fixed element and being rotatable around an axis, and an angle damping device disposed between the fixed element and the shaft, wherein said damping device comprises elastic means for dampening rotation of the shaft and axial drive means for controlling the elastic means, wherein the axial drive means move axially along the shaft in response to said rotation and axially compress the elastic means at a predetermined point in the rotation of the shaft, said compression of the elastic means dampening rotation of the shaft.

2. The windshield wiper device according to claim 1, wherein the axial drive means comprise a pressure element controlled by a driving device on the shaft.

3. The windshield wiper device according to claim 2, wherein the pressure element is a cam in the form of a washer which can move axially along the axis of the shaft.

4. The windshield wiper device according to claim 3, wherein said cam comprises rotation immobilization means.

5. The windshield wiper device according to claim 4, wherein the immobilization means comprise a rotational stop cooperating with axial grooves in the cam.

6. The windshield wiper device according to claim 3, wherein the cam comprises a plurality of angular sectors.

7. The windshield wiper device according to claim 6, wherein at least some of the angular sectors are inclined sectors.

8. The windshield wiper device according to claim 6, wherein at least some of the angular sectors are planar.

9. The windshield wiper device according to claim 6, wherein some of said sectors are situated in a different plane relative to others of said sectors.

10. The windshield wiper device according to claim 3, wherein said driving device comprises at least one projection extending radially in relation to said axis.

11. A windshield wiper device according to claim 2, wherein the pressure element is a sleeve slidable along the shaft.

12. A windshield wiper device according to claim 2, wherein the sleeve is driven in axial translation by a control member carried by the driving device.

13. A windshield wiper device according to claim 2, wherein said control member comprises a key rotationally fixed to the shaft.

14. A windshield wiper device according to claim 2, wherein said sleeve has an external thread cooperating with the fixed part.

15. The windshield wiper device according to claim 1, wherein the angle damper is carried by a housing.

16. The windshield wiper device according to claim 15, wherein the housing is formed in one piece with a fixed part, the fixed part being attachable to the fixed element.

17. A windshield wiper device according to claim 1, wherein the elastic means are at least one washer made from an elastomeric material.

18. The windshield wiper device according to claim 1, wherein the elastic means comprise at least one elastic metal washer.

19. A windshield wiper device, in particular for a motor vehicle, comprising:
- a shaft supported by a fixed element and being rotatable around an axis;
- an angle damping device disposed between the fixed element and the shaft; the damping device comprising elastic means which are axially compressed along the axis of the shaft to dampen rotation of the shaft;
- axial drive means for controlling the elastic means, wherein the axial drive means comprise a pressure element controlled by a driving device on the shaft;
- the pressure element comprising a cam in the form of a washer which is capable of moving axially along the axis of the shaft;
- the driving device comprising at least one projection extending radially in relation to the axis, wherein said projection comprises a pin passing orthogonally through the shaft.

* * * * *